UNITED STATES PATENT OFFICE.

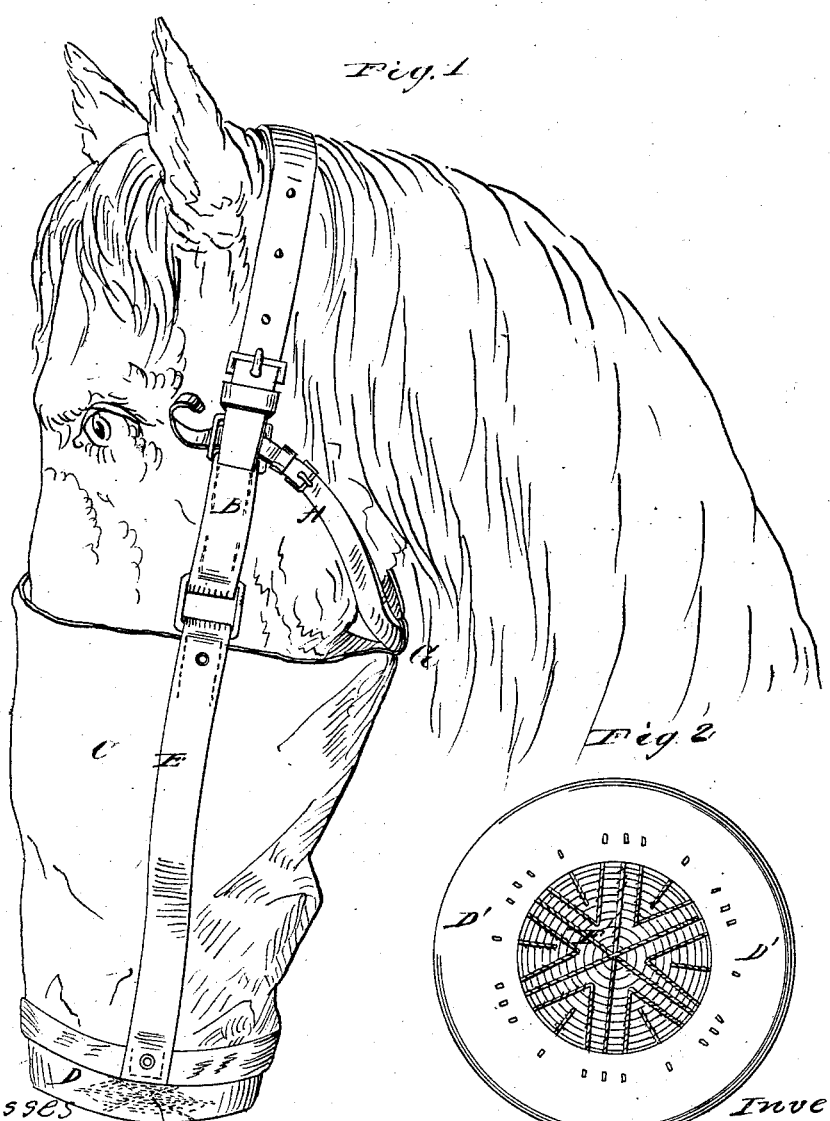

JOSEPH BECHER AND WILLIAM TUSTIN, OF PHILADELPHIA, PENNSYLVANIA.

IMPROVEMENT IN FEED-BAGS.

Specification forming part of Letters Patent No. 41,670, dated February 23, 1864.

*To all whom it may concern:*

Be it known that we, JOSEPH BECHER and WILLIAM TUSTIN, both of the city and county of Philadelphia, and State of Pennsylvania, have invented a new and useful Improvement in the Construction of Feed or Nose Bags for Horses and other Animals; and we do hereby declare that the following is a full and exact description thereof, reference being had to the accompanying drawings, and to the letters of reference marked thereon.

The nature of our invention consists, first, in providing the bottom of the feed-bag with a sieve or ventilator constructed of wire or any other material that will answer the desired end, admitting free ventilation to the bag and permitting the animal to respire freely while feeding, and at the same time allowing any sand, dust, &c., contained in the grain to pass through and escape, preventing deleterious effects to the animal from eating the same, or by inspiring it into its nostrils and lungs; second, in attaching a throat-latch to the hanger or neckband by means of which the feed-bag is suspended from the animal's neck, and passing it through a loop attached to the rear top part of the feed-bag under the animal's throat, preventing it from throwing the bag from its head and wasting the feed.

To enable others skilled in the art to make and use our invention, we will proceed to describe its construction and operation.

We construct the bottom of our feed-bag of stiff leather, made in the form of a round dish or basin, with a circular opening in the bottom extending to within an inch, more or less, of the outer edge of the dish. The sieve or ventilator is constructed by making a ring or circle of strong wire about one inch larger in diameter than the diameter of the opening in the bottom of the dish or basin. This ring forms the outer edge or circumference of the sieve or ventilator. The ring is strengthened by three wires extending across the diameter of the circle and crossing in the center of it. These braces are attached to the circular wire forming the circumference of the sieve by bending their ends around it and making them fast. The spaces between these wires are strengthened by pieces of wire bent in the shape of the letter V, the point extending into the space to near the center of the circle and the two ends being attached to the circular wire in the same manner as the other braces. The spaces within the last-named V-shaped braces are strengthened by having single straight wires extending into it, the ends of which are attached to the circular wire in the same manner as the others. To complete the sieve we take a smaller-sized wire than that of which the braces and circle are made, and, commencing where the braces cross in the center of the circle, we coil it around until we form a coil as large in circumference as the circumference of the inside of the ring. The spaces between each coil must not be so large as to allow oats or other grain to pass through them. The coil is secured to the braces by means of wire being whipped round them, securing them firmly together, the whole forming a firm and durable sieve. The sieve or ventilator is attached to the bottom of the feed-bag by placing it in the inside of the leather dish over the circular opening therein, and securing it by means of a wire passing continuously round the outside circular wire and through the leather, whipping it firmly to the dish forming the bottom of the bag. The leather of which the dish is made being stiff, and the sieve being made firmly and well braced, is not easily put out of order.

In using the feed-bag we suspend it from animal's neck by means of a hanger or neckband, B E I, in the same manner that feed-bags are ordinarily suspended.

In connection with the neckband we use a throat-latch, A, which we pass through a loop, C, attached to the rear top part of the bag under the animal's throat, and attach the ends of the throat-latch to the neck-strap on each side of the head by means of buckles or otherwise, preventing the animal from throwing the bag from his head and wasting the feed.

In constructing the ventilator we do not intend to confine ourselves to the wire sieve, but may use perforated tin, zinc, or sheet-iron, or any suitable substance; nor do we wish to confine ourselves to the particular construction of the sieve.

What we claim as our invention, and desire to secure by Letters Patent, is—

1. The strap A, running obliquely under the throat of the animal and fastened by a loop upon the rear top side of the bag, substantially as and for the purpose described.

2. The sieve or ventilator F, Figure II, or its equivalent, at the bottom of the bag, as herein described, substantially and for the purposes set forth.

JOS. BECHER.
WM. TUSTIN.

Witnesses:
H. J. RAMSDELL,
EDM. F. BROWN.